US008818342B2

(12) United States Patent
Kim et al.

(10) Patent No.: US 8,818,342 B2
(45) Date of Patent: Aug. 26, 2014

(54) TARGET SERVICE APPARATUS AND METHOD BASED ON DEVICE TO DEVICE DIRECT COMMUNICATION

(71) Applicant: Samsung Electronics Co. Ltd., Suwon-si (KR)

(72) Inventors: Ho-Dong Kim, Seoul (KR); Hyuk-Choon Kwon, Seoul (KR); Soo-Yeon Jung, Seoul (KR); Hae-Young Jun, Seoul (KR); Seung-Hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 13/752,822

(22) Filed: Jan. 29, 2013

(65) Prior Publication Data

US 2013/0196638 A1 Aug. 1, 2013

(30) Foreign Application Priority Data

Jan. 31, 2012 (KR) .................. 10-2012-0009803

(51) Int. Cl.
*H04M 3/42* (2006.01)
*H04W 4/02* (2009.01)

(52) U.S. Cl.
CPC ........................................ *H04W 4/02* (2013.01)
USPC ................ 455/414.1; 455/414.3; 455/517

(58) Field of Classification Search
None
See application file for complete search history.

(56) References Cited

U.S. PATENT DOCUMENTS

2004/0076280 A1* 4/2004 Ando et al. ............... 379/220.01
2009/0037194 A1* 2/2009 Roche ................................. 705/1
2009/0176508 A1* 7/2009 Lubeck et al. .............. 455/456.2

FOREIGN PATENT DOCUMENTS

KR 10-2001-0097444 A 11/2001
KR 10-2002-0005268 A 1/2002
KR 10-2004-0003758 A 1/2004

* cited by examiner

*Primary Examiner* — Erika A Washington
(74) *Attorney, Agent, or Firm* — Jefferson IP Law, LLP (57) ABSTRACT

An apparatus and a method for providing a call taxi service based on D2D communication are provided. When a user terminal executes a call taxi service, a call taxi service request is transferred to a terminal from at least one taxi located in a neighboring area of the user terminal, and then the user terminal directly selects one taxi or one taxi is selected through a competition between taxis. As a result, a process of providing the call to the selected taxi. Accordingly, the user has an advantage of using a quick call taxi service without going through a separate call center.

18 Claims, 10 Drawing Sheets

TARGET SERVICE APPARATUS AND METHOD BASED ON DEVICE TO DEVICE DIRECT COMMUNICATION

PRIORITY

This application claims the benefit under 35 U.S.C. §119 (a) to a Korean patent application filed on Jan. 31, 2012 in the Korean Intellectual Property Office and assigned Serial No. 10-2012-0009803, the entire disclosure of which is hereby incorporated by reference.

BACKGROUND OF THE INVENTION

1. Field of the Invention

The present invention relates to a target service apparatus and method. More particularly, the present invention relates to a call taxi service apparatus and method based on Device to Device (D2D) direct communication.

2. Description of the Related Art

When a user dials a telephone number of a particular taxi company or the like and informs a call center agent of their position, the call center agent calls a taxi which is closest to the user and is available to provide a taxi service to the user. Then, a taxi driver is informed of a telephone number and the position of the user through the call center agent. At this point, the taxi driver may talk to the user over the telephone. The taxi driver then moves to the position of the user.

Another call taxi service method is to use a call taxi application installed in a user terminal such as a smart phone. Accordingly, the user should execute the call taxi application to search for or select a telephone number of a taxi company, and then talk to the call center agent over the telephone. In this case, as described above, the taxi driver also moves to the position of the user according to an instruction of the call center agent.

Further, as another example of the call taxi application, some of the call taxi applications may support a map service showing the position of the user on the map, which additionally requires obtaining position information by using a Global Positioning System (GPS), a cellular technology, a Wi-Fi technology or the like.

As described above, the user should make a request for a call taxi through a call center and know in advance a taxi company telephone number for the call taxi. When the user does not know the taxi company telephone number, the user receives help from a call taxi application, a directory assistance service, a search in a telephone directory, or the like. If there are a lot of incoming calls when the user makes a call to the call center, a waiting time may be long, and thus an unnecessary delay is generated.

Further, the taxi company uses a separate server for controlling the call taxi application and an agent for responding to a call. As a result, the taxi company consumes continuous maintenance fees.

Moreover, since a taxi driver may be informed of where the user is located only through the call center, the taxi driver may acquire user information indirectly via the call center even though the user is located near the taxi.

Furthermore, since the taxi driver is informed of a telephone number of the user by the call center and then may acquire a position of the user through a direct call with the user, a long call or waiting time may result.

In addition, a call taxi service method using position information involves measuring a position through a separate GPS or the like, and accordingly, the user should turn "on" a GPS mode of the user terminal. When the GPS is turned on, additional power is consumed, thereby decreasing an amount of time the portable terminal may be used.

Accordingly, there is a need for an apparatus and a method that addresses at least the problems and/or disadvantages described above.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for providing a quick call taxi service which a user having a user terminal can easily use without going through a separate call center.

Another aspect of the present invention is to provide an apparatus and a method for providing a quick call taxi service based on Device to Device (D2D) communication.

In accordance with an aspect of the present invention, a method of receiving a target service by a user terminal is provided. The method includes receiving service information related to the target service among services based on D2D direct communication from two or more neighboring terminals adjacent to the user terminal, transmitting a target service request to the neighboring terminals, receiving a response to the target service request from the neighboring terminals, and establishing a session connection with one of the neighboring terminals based on the response from the neighboring terminals and then performing the target service.

In accordance with another aspect of the present invention, a user terminal for receiving a target service is provided. The user terminal includes a connector for receiving service information related to the target service among services based on D2D direct communication from one or more neighboring terminals adjacent to the user terminal, and a controller for, when the service information is received from two or more neighboring terminals, transmitting a target service request to the neighboring terminals, and, when a response to the target service request is received from the neighboring terminals, establishing a session connection with one of the neighboring terminals through the connector based on the response from the neighboring terminals and then performing the target service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The detailed description set forth herein will provide representative exemplary embodiments of the present invention to address technical problems. Further, for the convenience in description, names of entities defined in a Device to Device (D2D) direct communication service will be used, but the standard thereof and the names do not limit the scope of the present invention and the present invention may be applied to any system having a similar technical background.

The exemplary embodiments of the present invention provide an apparatus and a method for providing a call taxi service based on D2D communication. According to the exemplary embodiments of the present invention, when a user terminal executes a call taxi service, a call taxi service request is transferred to a terminal within at least one taxi located within a user terminal neighboring area and thus the user terminal directly selects one taxi or one taxi is selected through a competition between taxis, through which the selected taxi is connected to the call. Accordingly, a user has an advantage of using a quick call taxi service without going through a separate call center.

Hereinafter, in exemplary embodiments of the present invention, a case where the call taxi service is provided as a target service among services based on the D2D communication will be described. Hereinafter, for convenience in description, exemplary embodiments of the present invention will be described in the context of a user terminal storing and executing an application for a call taxi service. However, the present invention is not limited thereto. For example, the present invention is equally applicable to the case where the application for the call taxi service is stored and executed remotely from the user terminal. In this case, the user terminal may be functioning as second screen device to a device that stores and executes the application, may be functioning as a standalone device that interacts with the remotely executed application, etc. Here, the user terminal may receive information to be displayed to the user from the remotely executing application and the user terminal may communicate user input information to the remotely executing application. When the application for the call taxi service is stored and executed remotely from the user terminal, the user terminal may utilize a browser or another application to facilitate the interactions with the application. In addition, when the application for the call taxi service is stored and executed remotely from the user terminal, communications with neighboring taxi terminals may be via or not via the remotely executed applications. In another example, the present invention is equally applicable to the case where some of the functions of the call taxi service described herein being performed by an application stored and executed on the user terminal with other of the functions of the call taxi service described herein being performed by an application stored and executed remotely from the user terminal. Hereinafter, a main configuration of a system for providing the call taxi service will be described with reference to FIG. 1.

Figure 1:
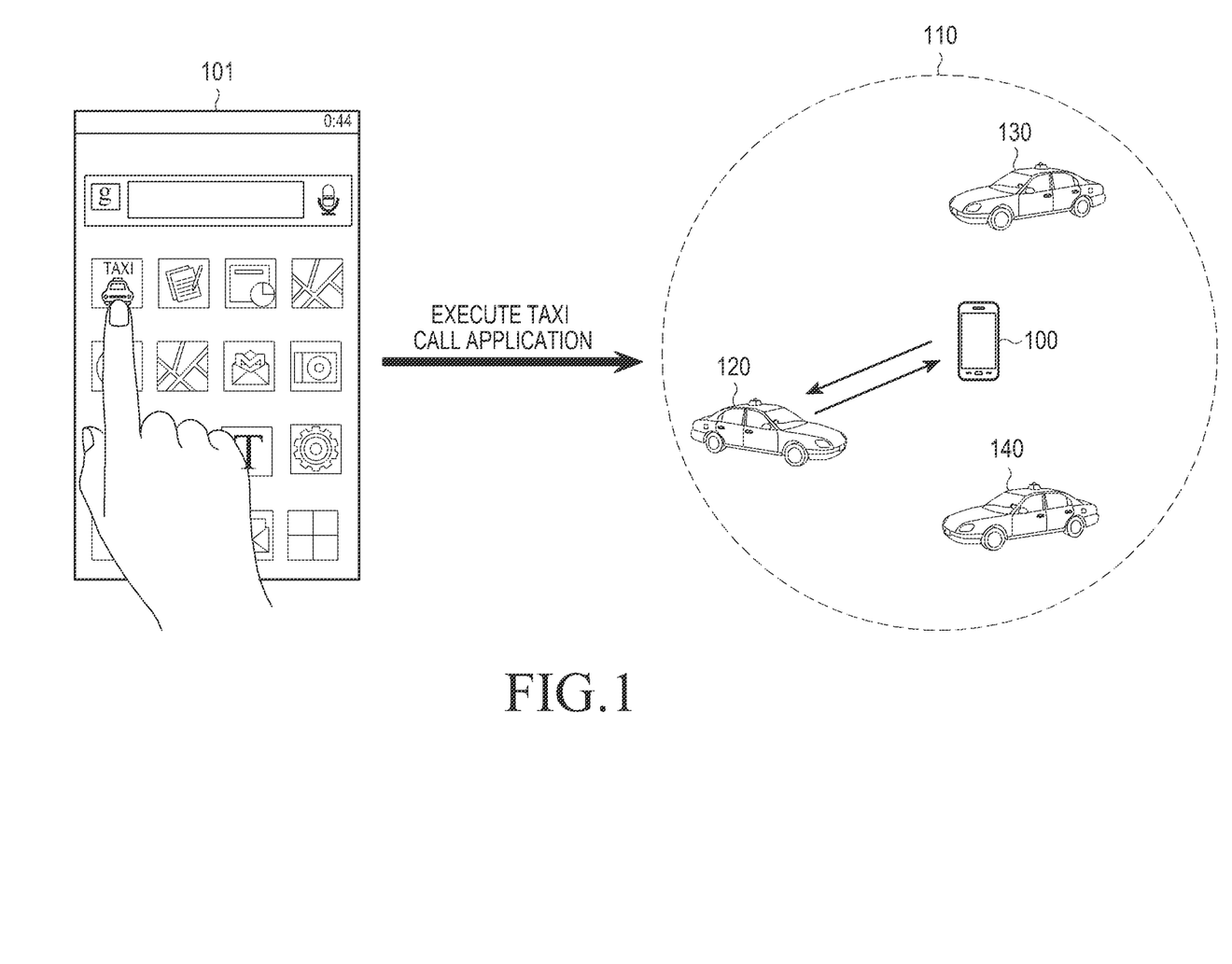
FIG. 1 is a diagram illustrating a call taxi service method according to an exemplary embodiment of the present invention.

FIG. 1 is a diagram illustrating a call taxi service method according to an exemplary embodiment of the present invention.

Referring to FIG. 1, a user terminal 100 is a terminal carried by a user who desires to receive a call taxi service, the user terminal 100 having a call taxi application.

Taxis 120, 130, and 140 are vehicles serving users who desire to receive the call taxi service based on the D2D communication, and it is preferable that each of the taxis 120, 130, and 140 has a terminal capable of communicating with the user terminal 100 based on the D2D communication. When the taxis 120, 130, and 140 are vacant, the taxis 120, 130, and 140 periodically or aperiodically broadcast a signal or a message containing taxi information. In the present disclosure, the terminal included in the taxi 120, 130, or 140 is referred to as a taxi terminal for convenience in description.

The user terminal 100 and the taxi terminals 120, 130, and 140 correspond to devices capable of supporting a D2D service, such as a smart phone, a mobile phone, digital camera, a digital audio player, a game machine, a TeleVision (TV), a display device, a head unit for a vehicle, a notebook, a laptop, a tablet Personal Computer (PC), a Personal Media Player (PMP), a Personal Digital Assistant (PDA), a navigation device and the like.

First, when the call taxi application is executed in the user terminal 100, as shown in screen 102, the taxi terminals 120, 130, and 140 located within a neighboring area 110 of the user terminal 100 are found. At this time, the taxi terminals 120, 130, and 140 supporting the call taxi service are found. Since a size of the neighboring area 110 approximately ranges from hundreds of meters to one kilometer according to a D2D service radius, the service for calling the taxi terminal adjacent to the user terminal 100 can be provided.

Here, a call taxi method according to an exemplary embodiment of the present invention may be divided into two methods.

First, there is a method in which the user terminal 100 directly calls the neighboring taxi terminals 120, 130, and 140. According to the direct call method, when the user executes the call taxi application installed in the user terminal 100, the user terminal 100 scans signals of the neighboring taxis and acquires taxi information. Here, initially scanned signals of the neighboring taxis may be beacon signals. The user may directly select the taxi by the taxi information acquired through the scanning. In response to the selection, the user terminal 100 is connected to the selected taxi through a taxi selection algorithm applied to the user terminal 100 to inform a taxi driver of a position of the user.

Another method corresponds to an indirect call method in which when the user terminal 100 transmits a signal indicating a boarding intention to the neighboring taxi terminals 120, 130, and 140, the user terminal 100 receives a call from a taxi terminal selected through a competition between the taxis. Specifically, when the user executes the call taxi application, the user terminal 100 transmits a message informing that the user has an intention to take a taxi to the neighboring taxi terminals 120, 130, and 140. In response to the message, the neighboring taxi terminals 120, 130, and 140 compete with each other to acquire an opportunity to be connected to the user terminal 100. The taxi terminal selected through the competition makes a call to the user based on the D2D communication or acquires position information of the user through Short Message Service (SMS)/Multimedia Messaging Service (MMS) transmission/reception and data transmission/reception.

Hereinafter, various exemplary embodiments of the present invention will be separately described as follows.

In a first exemplary embodiment of the present invention, the user terminal selects one taxi based on service information received from neighboring vacant taxi terminals, connects a session with the selected taxi, and communicates with the taxi.

In a second exemplary embodiment of the present invention, the user terminal makes a request for the call taxi service to neighboring taxi terminals in a state where the user terminal is session-connected with the neighboring taxi terminals supporting the call taxi service, and then communicates with the taxi transmitting a response to the request.

In a third exemplary embodiment of the present invention, the user terminal makes a request for the call taxi service to neighboring taxi terminals, transmits competitive taxi information based on all responses to the request, connects a session with only the taxi selected through a competition between the neighboring taxi terminals, and then communicates with the selected taxi.

In a fourth exemplary embodiment of the present invention, the user terminal makes a request for the call taxi service to neighboring taxi terminals, receives all responses to the request, selects one taxi to connect a session with the selected taxi, and then communicates with the selected taxi.

In a fifth exemplary embodiment of the present invention, when the user terminal makes a request for the call taxi service to neighboring taxi terminals, transmits competitive taxi information based on all responses to the request to the neighboring taxi terminals, and receives information generated through a competition between the neighboring taxi terminals, the user terminal recognizes the selected taxi terminal through the received information, connects a session with only the selected taxi, and then communicates with the selected taxi.

An operation of the user terminal 100 implementing the above-described exemplary embodiments will be described with reference to FIG. 2.

Figure 2:
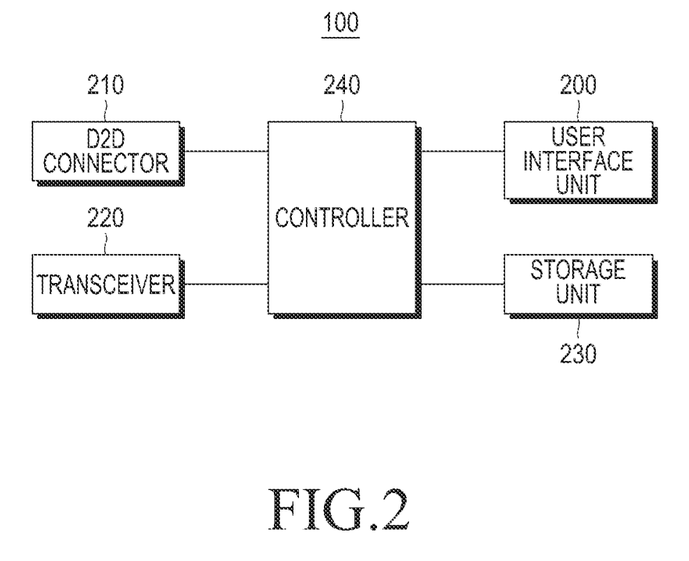
FIG. 2 is an internal block diagram of a user terminal according to an exemplary embodiment of the present invention.

FIG. 2 is an internal block diagram of a user terminal according to an exemplary embodiment of the present invention.

Referring to FIG. 2, the user terminal 100 includes a user interface 200, a D2D connector 210, a transceiver 220, a storage unit 230, and a controller 240.

The user interface 200 is an input means of the user, and outputs a call taxi service application screen. The user may select one taxi based on acquired taxi information through the screen. As described above, the user may select a desired taxi from a taxi list on the screen output through the user interface 200, or one taxi may be selected according to a selection algorithm installed in the user terminal 100.

The D2D connector 210 searches for neighboring taxi terminals supporting the call taxi service, and serves to perform a session connection with the neighboring taxi terminals. Further, the D2D connector 210 also serves to perform SMS/MMS transmission/reception or data transmission/reception with the neighboring taxi terminals based on the D2D communication.

The transceiver 220 makes a call to communicate with the selected taxi terminal or processes a signal according to reception of the call from the taxi terminal.

The storage unit 230 is a non-transitory machine readable storage medium recording a program for executing a call taxi service method according to one or more of the exemplary embodiments of the present invention. The application for the call taxi service may be downloaded through an external server or the like.

Further, the storage unit 230 stores information on a service supported by the user terminal 100. When the storage unit 230 acquires the service information from the neighboring taxi terminals, the storage unit 230 also stores the acquired service information. The acquired service information contains terminal identification information, service identification information, taxi company information, time information, position information, taxi driver information and the like.

First, the terminal identification information may be a terminal IDentifier (ID), and identification information of the user terminal 100 is differently set from identification information of neighboring taxi terminals recognized after recognizing identification information of the neighboring taxi terminals through a received broadcasting signal. The identification information of the user terminal 100 is temporary identification information used in a local area where the D2D service is performed, and corresponds to an ID used only for a connection with the neighboring taxi terminals. Further, in some cases, the terminal ID may be assigned a globally distinguishable ID.

In addition, the service identification information indicates a service ID, a service name or the like, and also indicates a type of service. For example, in an exemplary embodiment of the present invention, the service identification information informing that a type of service based on the D2D communication corresponds to the call taxi service is stored in the storage unit 230. In addition, the service identification information supportable by the user terminal 100 may be stored in the storage unit 230 in a table form.

Further, the taxi company information indicates taxi company related information, such as a type of taxi company, a type of taxi and the like. The time information indicates a time for synchronization between the user terminal 100 and taxi terminals.

When a call taxi service application is executed, the controller 240 searches for a vacant taxi terminal supporting the call taxi service. To this end, the controller 240 performs an operation of receiving a broadcasting signal from the vacant taxi terminals or directly transmitting a call taxi service request to receive a response to the request. Then, the controller 240 performs a connection with a taxi terminal selected by the user or selected through a competition, which completes a call taxi service operation.

The description of the user terminal 100 may, in certain exemplary embodiments, be equally applicable to a device that is remotely executing the application for the call taxi service. Accordingly, a description thereof is omitted herein from brevity. A detailed operation of the controller 240 will be described according to exemplary embodiments of the present invention with reference to FIGS. 3 to 7B.

First, a call taxi service providing process according to a first embodiment of the present invention will be described with reference to FIG. 3.

Figure 3:
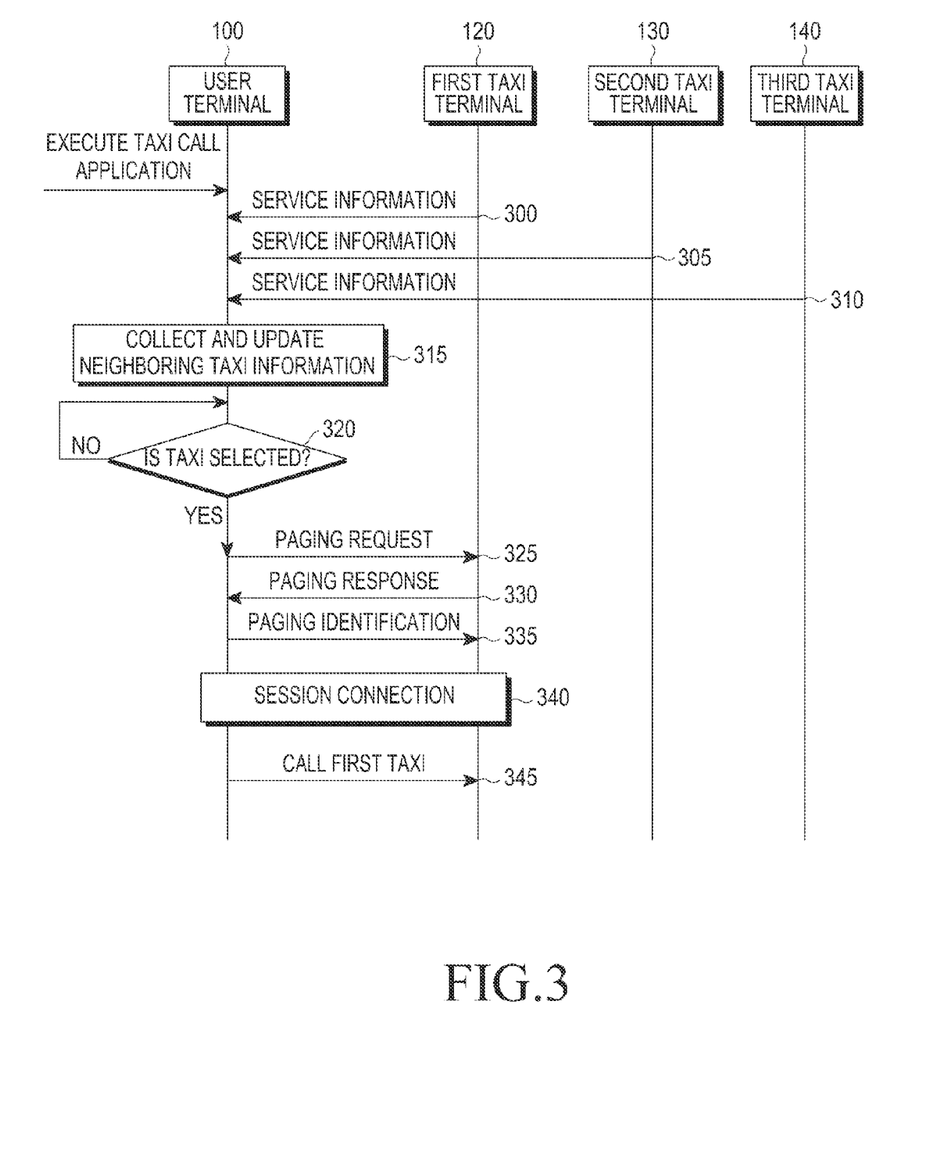
FIG. 3 is a flowchart illustrating a call taxi service providing process according to a first exemplary embodiment of the present invention.

FIG. 3 is a flowchart illustrating a call taxi service providing process according to a first exemplary embodiment of the present invention.

Referring to FIG. 3, when a call taxi application within the user terminal 100 is executed by the user, the user terminal 100 receives service information from at least one neighboring taxi terminal. FIG. 3 illustrates that the user terminal 100 receives service information from a plurality of neighboring taxi terminals 120, 130, and 140 in steps 300 to 310. Here, since the neighboring taxi terminals 120, 130, and 140 transmitting the service information are vacant and thus can pick-up the user, the neighboring taxi terminals 120, 130, and 140 broadcast the service information to actively find neighboring passengers. The service information contains terminal identification information, service identification information, taxi company information, time information, position information, taxi driver information and the like.

When a plurality of service information is received, it is determined whether the service identification information contained in the service information indicates the call taxi service among the D2D based services. When it is determined that the service identification information indicates the call taxi service based on the received service information, the user terminal 100 collects neighboring taxi information from the received service information and updates the collected neighboring taxi information in step 315. Accordingly, the user terminal configures a taxi list based on the collected neighboring taxi information and outputs the taxi list on the screen. Then, when one taxi is selected by the user in step 320, the user terminal transmits a paging request to the selected taxi terminal 120 in step 325. The paging request is to configure a network through a session connection with the selected taxi terminal 120. In response to the paging request, the user terminal 100 receives a paging response from the taxi terminal 120 in step 330, and transmits a paging acknowledgement in step 335, so that the session connection is established in step 340. Subsequently, the user terminal 100 completes the call taxi service process by calling a first taxi in step 345. Here, the calling of the first taxi means that the user directly communicates with a driver of the first taxi.

Meanwhile, the call taxi service providing process according to the second exemplary embodiment of the present invention will be described with reference to FIGS. 4A and 4B. FIG. 4B is a continuation of FIG. 4A.

Figure 4A:
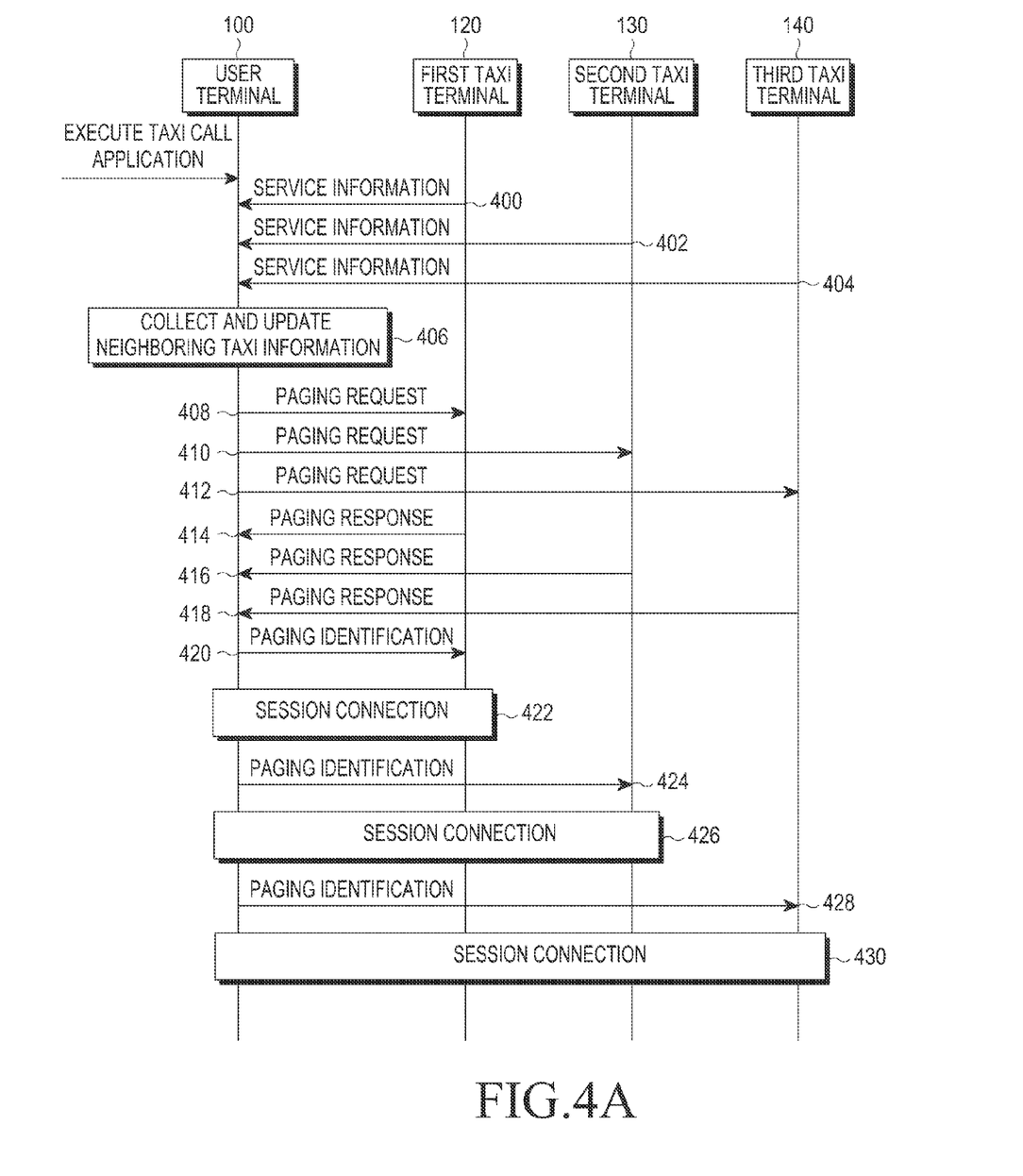
FIGS. 4A and 4B are flowcharts illustrating a call taxi service providing process according to a second exemplary embodiment of the present invention.
Figure 4B:
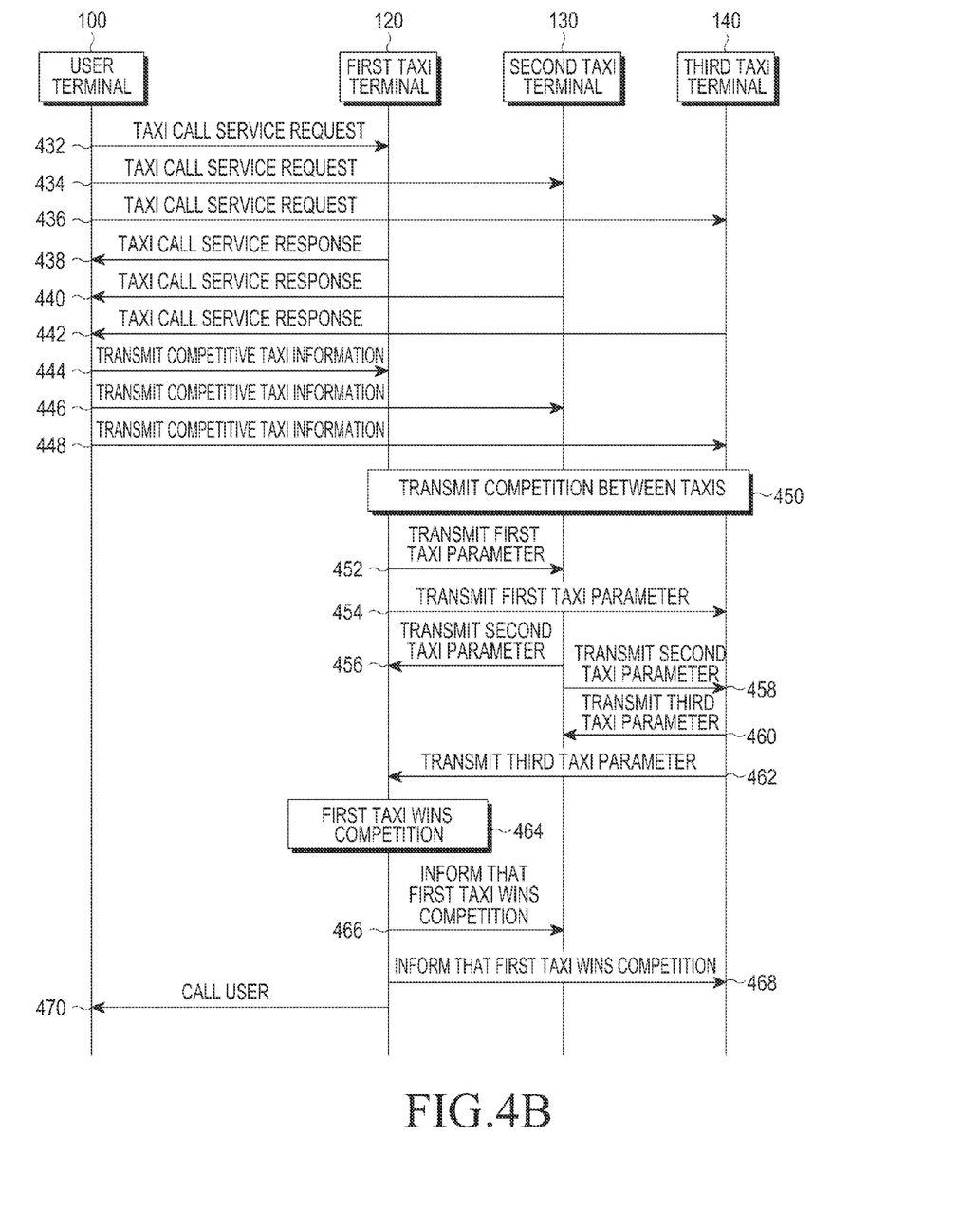

FIGS. 4A and 4B are flowcharts illustrating a call taxi service providing process according to a second exemplary embodiment of the present invention.

First, since step 400 to 406 of FIG. 4A are the same as steps 300 to 315 of FIG. 3, detailed descriptions thereof will be omitted herein for brevity. However, there is only a difference in that while the user terminal 100 directly selects one taxi in FIG. 3, the user terminal 100 establishes a session connection with the neighboring taxi terminals 120, 130, and 140 and then communication is performed by the taxi selected through a competition between the taxis in FIG. 4A. At this time, since the user terminal 100 may know that the taxi terminals 120, 130, and 140 support the call taxi service based on service information acquired in steps 400 to 404, the user terminal 100 establishes the session connection with the taxi terminals 120, 130, and 140 supporting the call taxi service. Accordingly, the user terminal 100 may establish the session connection with only the taxi terminals 120, 130, and 140 supporting the call taxi service, which the user terminal 100 desires to use, without session connections with all neighboring terminals capable of performing the D2D based service, so that an optimized service can be provided.

Accordingly, steps 408 to 430 are the same as steps 325 to 340 of FIG. 3, but the only difference is that the user terminal establishes the session connection with all neighboring taxi terminals 120, 130, and 140 having transmitted the service information, so detailed descriptions thereof will be omitted herein for brevity.

As described above, the user terminal 100 transmits a call taxi service request to the neighboring taxi terminals 120, 130, and 140 in a state where the user terminal 100 is session-connected with the neighboring taxi terminals 120, 130, and 140 in step 432 to 436. In response to the request, the user terminal 100 receives call taxi service responses from the neighboring taxi terminals 120, 130, and 140 in steps 438 to 442. Here, each call taxi service response contains information which can identify a taxi and information informing that a taxi can be currently used. Then, the user terminal 100 transmits competitive taxi information based on information on each taxi terminal 120, 130, or 140 contained in the call taxi service response to each taxi terminal 120, 130, or 140 in steps 444 to 448. Here, the competitive taxi information means information on competitive taxis. For example, the taxi terminal 120 recognizes the neighboring taxi terminals 130 and 140 as the competitive taxis with which the taxi terminal 120 competes, based on the competitive taxi information.

As described above, each taxi terminal 120, 130, or 140 may detect the competitive taxi terminals based on the received competitive taxi information. Accordingly, each taxi terminal 120, 130, or 140 performs a competition to acquire an opportunity to be connected with the user terminal 100 in step 450. At this time, each taxi terminal 120, 130, or 140 is in a state where a D2D network is configured through the session connection with the user terminal 100, so that the taxi terminals 120, 130, and 140 can exchange information between them. Accordingly, each taxi terminal 120, 130, or 140 transmits its own parameter to other taxi terminals based on the competitive taxi information to hold a dominant position. As described above, the taxi terminals 120, 130, and 140 exchange their own parameters in steps 452 to 462. Here, the exchanged parameters may be a random number, a signal intensity, a priority and the like. Accordingly, through a comparison of the parameters, when the first taxi wins the competition in step 464, the taxi terminal 120 informs the other terminals 130 and 140 that the first taxi wins the competition in steps 466 and 468. Then, the winning taxi terminal 120 calls the user terminal 100 in step 470 and then establishes a communication connection.

Meanwhile, the call taxi service providing process according to the third exemplary embodiment of the present invention will be described with reference to FIGS. 5A and 5B. FIG. 5B is a continuation of FIG. 5A.

Figure 5A:
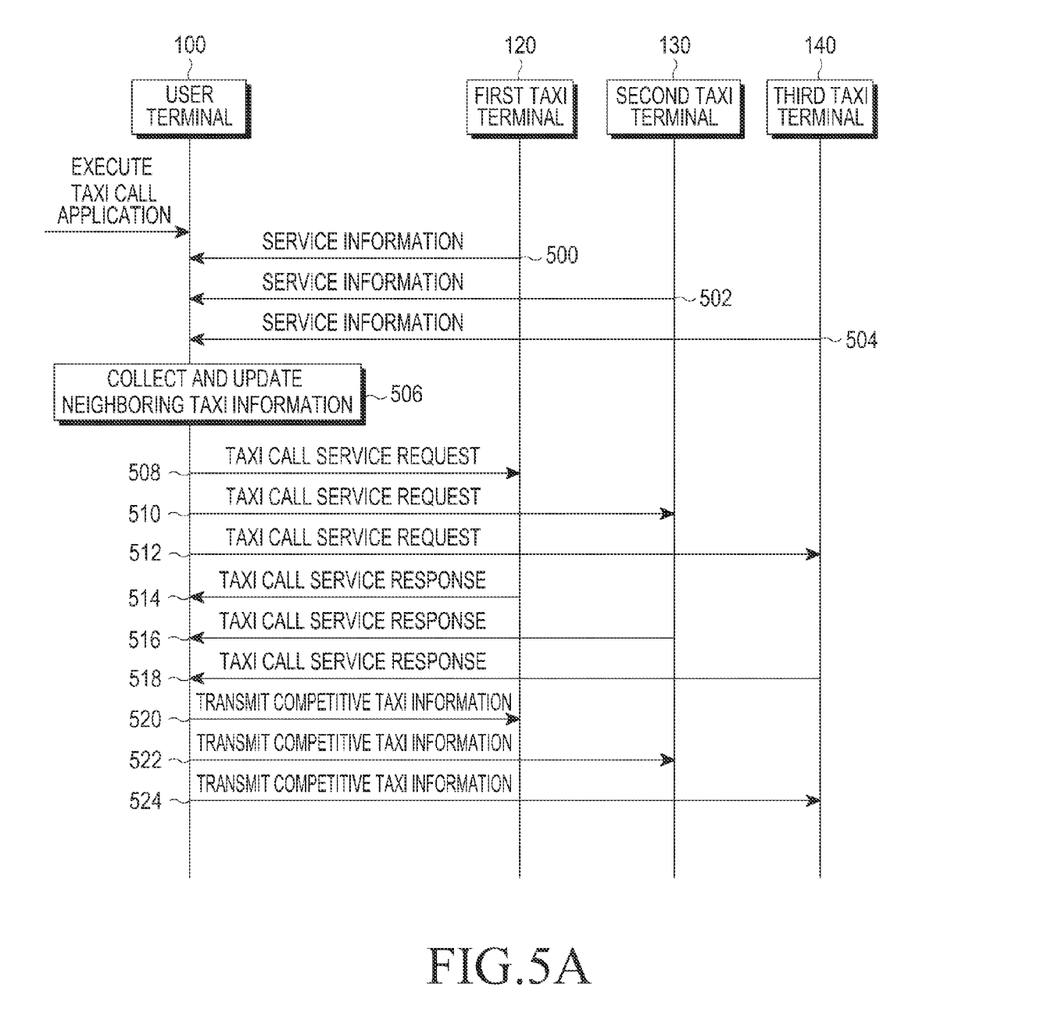
FIGS. 5A and 5B are flowcharts illustrating a call taxi service providing process according to a third exemplary embodiment of the present invention.
Figure 5B:
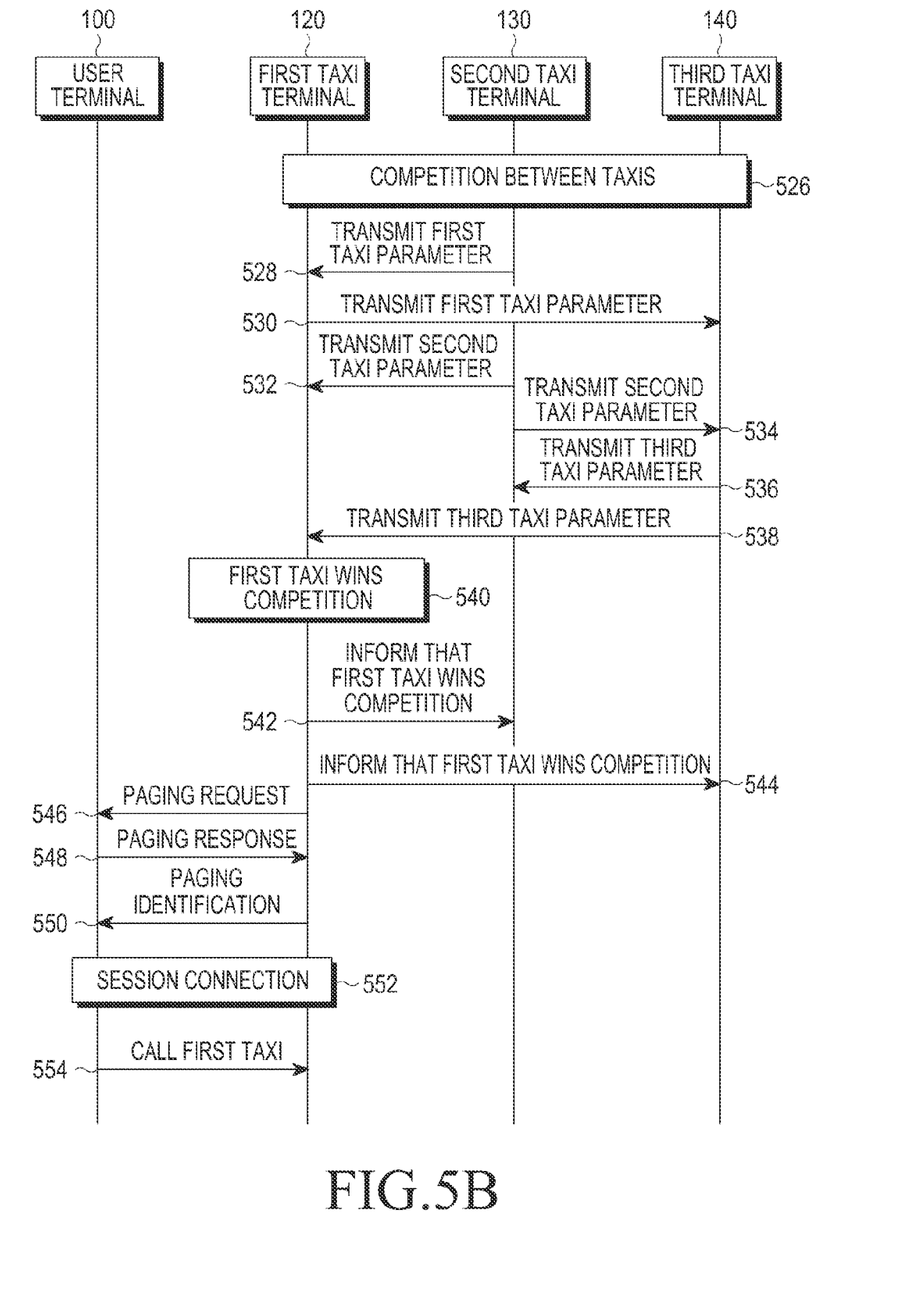

FIGS. 5A and 5B are flowcharts illustrating a call taxi service providing process according to a third exemplary embodiment of the present invention.

Steps 500 to 506 of FIG. 5A are the same as steps 300 to 315 of FIG. 3, and steps 508 to 524 are the same as steps 432 to 448 of FIG. 4B. Further, steps 526 to 544 of FIG. 5B are the same as steps 450 to 468 of FIG. 4B. However, FIG. 5B has only a difference from FIG. 4B in that the winning taxi terminal 120 transmits a paging request to the user terminal 100 in step 546, only the taxi terminal 120 is session-connected with the user terminal 100 through steps 548 to 552, and then the user terminal 100 calls only the winning taxi terminal 120 in step 554.

As described above, since the user terminal 100 is session-connected with only the taxi terminal 120, D2D based data transmission/reception is possible. In this case, even though the user of the user terminal 100 does not inform of a position of the user terminal 100 through a voice, actual position information of the user terminal 100 can be transmitted to the taxi terminal 120, so that it is possible to reduce an unnecessary standby time for describing the position of the user.

Meanwhile, the call taxi service providing process according to the fourth exemplary embodiment of the present invention will be described with reference to FIG. 6.

Figure 6:
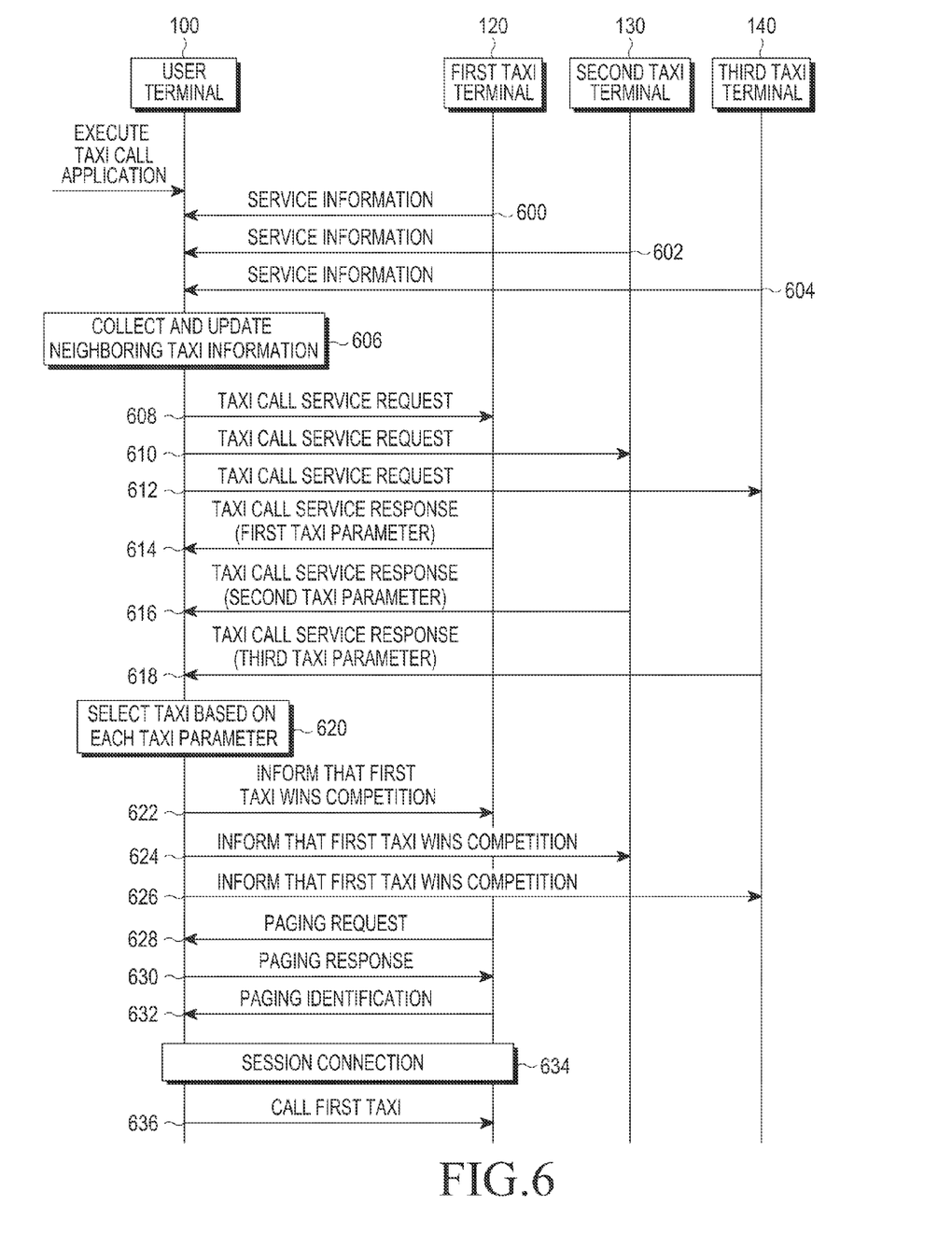
FIG. 6 is a flowchart illustrating a call taxi service providing process according to a fourth exemplary embodiment of the present invention.

FIG. 6 is a flowchart illustrating a call taxi service providing process according to a fourth exemplary embodiment of the present invention.

Referring to FIG. 6, steps 600 to 612 of FIG. 6 are the same as steps 500 to 512 of FIG. 5A. However, there is only a difference in that each taxi terminal 120, 130, or 140 inserts its own parameter into a call taxi service response and then transmits the call taxi service response in response to the call taxi service request in steps 614 to 618.

At this time, each of the neighboring taxi terminals 120, 130, and 140 may be located within a D2D service available area based on the user terminal 100, for example, a radius ranging from hundreds of meters to one kilometer to exchange a message with the user terminal 100, but the neighboring taxi terminals 120, 130, and 140 may escape from each other's radius. In this case, since the neighboring taxi terminals 120, 130, and 140 cannot communicate with each other, a relay of the user terminal 100 is required.

To this end, in the fourth exemplary embodiment of the present invention, the neighboring taxi terminals 120, 130, and 140 provide their own parameters to the user terminal 100. In this case, the user terminal 100 selects one taxi based on each taxi parameter in step 620. At this time, the one taxi may be directly selected by the user or selected according to a selection algorithm. As described above, when one taxi is selected, the user terminal 100 informs the taxi terminals 120, 130, and 140 that the first taxi wins the competition in steps 622 to 626. Thereafter, steps 628 to 636 are the same as steps 546 to 554 of FIG. 5B.

Meanwhile, the call taxi service providing process according to the fifth exemplary embodiment of the present invention will be described with reference to FIGS. 7A and 7B. FIG. 7B is a continuation of FIG. 7A.

Figure 7A:
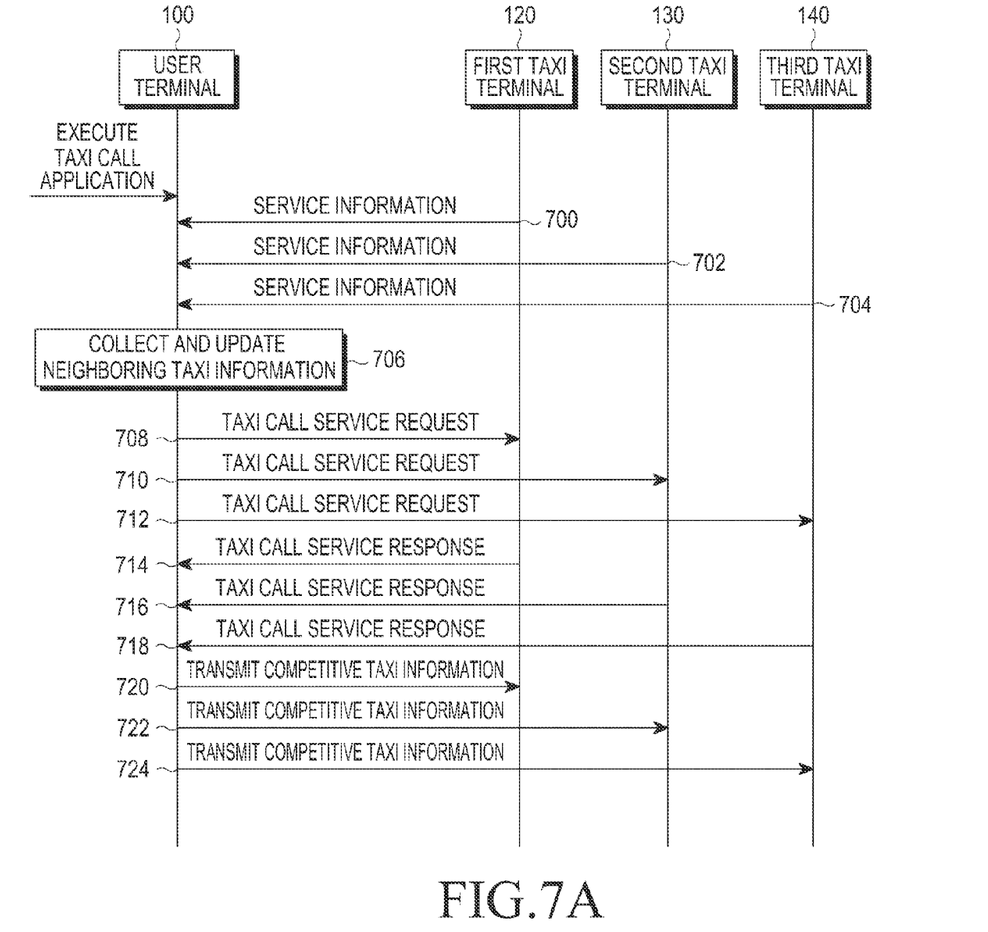
FIGS. 7A and 7B are flowcharts illustrating a call taxi service providing process according to a fifth exemplary embodiment of the present invention.
Figure 7B:
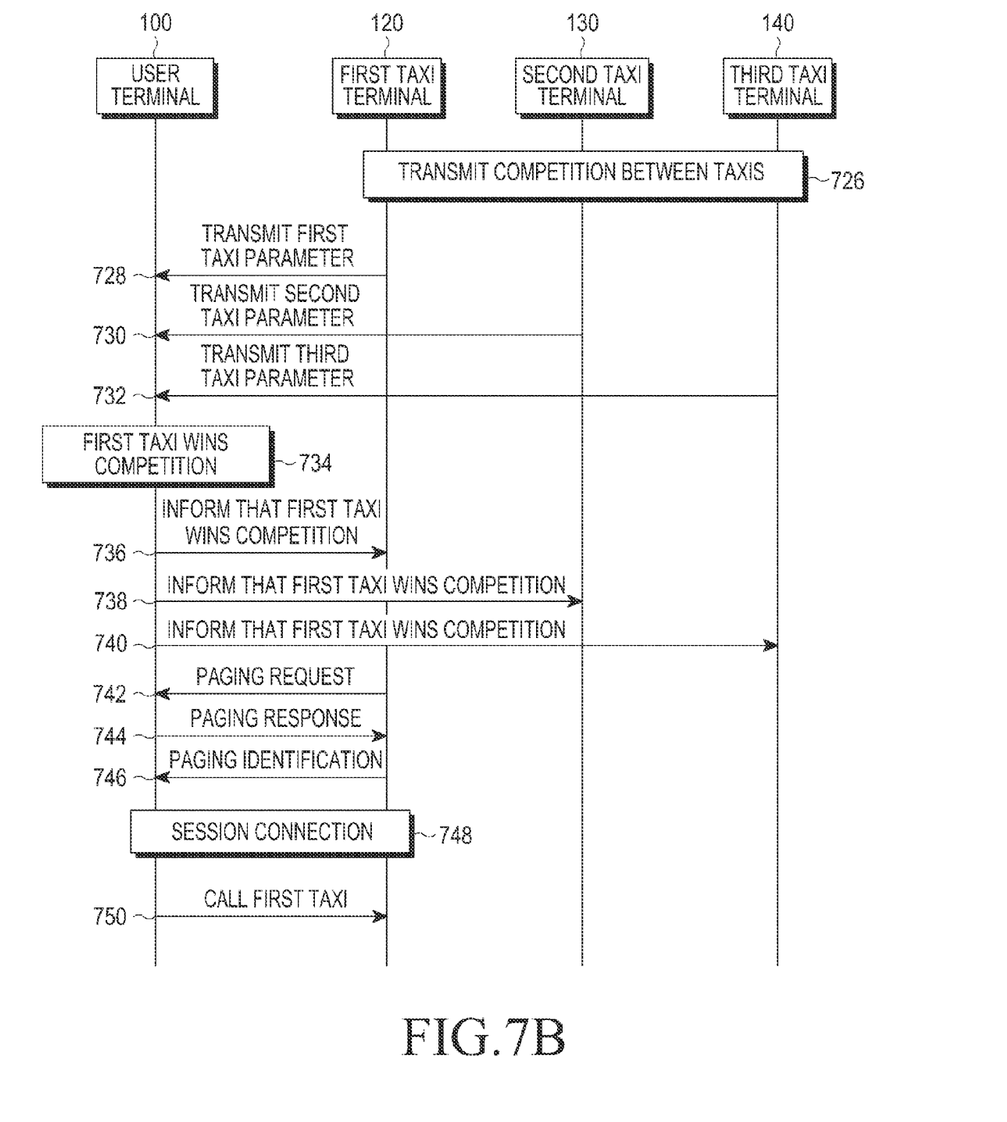

FIGS. 7A and 7B are flowcharts illustrating a call taxi service providing process according to a fifth exemplary embodiment of the present invention.

Steps 700 to 724 of FIG. 7A are the same as steps 500 to 524 of FIG. 5A. However, there is only a difference in that each taxi terminal 120, 130, or 140 transmits its own parameter to the user terminal 100 in steps 728 to 732 through a competition between the taxis in step 726. Thereafter, steps 734 to 750 of FIG. 7B are the same as steps 620 to 636 of FIG. 6.

Meanwhile, as the competition method between the taxis used in the exemplary embodiments of the present invention, the case where the parameters are exchanged has been described. In a more detailed description, a method using a random number among the parameters corresponds to a method in which each taxi terminal 120, 130, or 140 generates a random number by itself, and then taxi terminals 120, 130, and 140 exchange the generated random numbers or transmit the generated random numbers to the user terminal 100 to allow the taxi having a smallest number or largest number to have a priority.

Further, a method of using a signal intensity among the parameters corresponds to a method in which the user terminal 100 measures a signal intensity of a message from each taxi terminal 120, 130, or 140 and selects a taxi having a strongest signal intensity.

In addition, a method using a priority corresponds to a method in which the taxi terminals exchange a priority or transmit the priority to the user terminal to provide the priority to a taxi having a highest priority. When there is a taxi company preferred by the user, a taxi of the preferred taxi company may be set to be assigned a highest priority.

According to the exemplary embodiments of the present invention, since the taxi and the user are directly connected with each other without going through the call center, a connection process between the user and the call center may be omitted and a connection process between the call center and a taxi driver may also be omitted. As described above, the exemplary embodiments of the present invention provide the call taxi service based on the D2D communication, so that the user has an advantage of using a quick call taxi service.

Further, the user may easily call a taxi adjacent to the user regardless of a type of taxi company and the taxi driver may respond the call by actively and directly receiving the call from the adjacent user, thereby reducing a taxi movement time and an vacant taxi time.

It may be appreciated that the exemplary embodiments of the present invention can be implemented in hardware, or a combination of hardware and software. Any such software may be stored, for example, in a volatile or non-volatile storage device such as a Read-Only Memory (ROM), a memory such as a Random Access Memory (RAM), a memory chip, a memory device, or a memory Integrated Circuit (IC), or a recordable optical or magnetic medium such as a Compact Disc (CD), a Digital Versatile Disc (DVD), a non-transitory magnetic disk, or a magnetic tape, regardless of erasability or re-recordability. It can be also appreciated that the memory included in the mobile terminal is one example of non-transitory machine-readable devices suitable for storing a program including instructions that are executed by a processor device to thereby implement embodiments of the present invention. Therefore, exemplary embodiments of the present invention provide a program including codes for implementing a system or method claimed in any claim of the accompanying claims and a non-transitory machine-readable device for storing such a program. Further, this program may be electronically conveyed through any medium such as a communication signal transferred via a wired or wireless connection.

The user terminal according to exemplary embodiments of the present invention may receive the program from a program providing apparatus through a wire or wirelessly. The program providing apparatus may include a non-transitory memory for storing a program containing instructions for instructing the user terminal to perform a preset call taxi service method, a communication unit for performing wired or wireless communication with the user terminal, and a controller for transmitting the program to the user terminal according to a request of the user terminal or automatically.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of receiving a call taxi service by a user terminal, the method comprising:
    receiving service information related to the call taxi service among services based on Device to Device (D2D) direct communication from two or more neighboring terminals adjacent to the user terminal;
    transmitting a call taxi service request to the neighboring terminals;
    receiving a response to the call taxi service request from the neighboring terminals; and
    establishing a session connection with one of the neighboring terminals based on the response from the neighboring terminals and then performing the call taxi service.

2. The method of claim 1, wherein the service information contains at least one of identification information of the neighboring terminals, service identification information indicating the call taxi service among the services based on the D2 D communication, taxi company information, time information, position information, and taxi driver information.

3. The method of claim 1, wherein each of the neighboring terminals is mounted within a taxi, and is one of a smart phone, a mobile phone, a digital camera, a digital audio player, a game machine, a TeleVision (TV), a display device, a head unit for a vehicle, a notebook, a laptop, a tablet Personal Computer (PC), a Personal Media Player (PMP), a Personal digital Assistant (PDA), and a navigation device.

4. The method of claim 1, wherein the response to the call taxi service request contains information informing that identification information of the neighboring terminals and the call taxi service are available.

5. The method of claim 4, further comprising transmitting competition information of the neighboring terminals based on the response to the call taxi service request to the neighboring terminals.

6. The method of claim 5, further comprising:
    after transmitting the competition information, receiving information for determining a dominant position in a competition between the neighboring terminals from the neighboring terminals; and
    determining one neighboring terminal from the neighboring terminals based on the information for determining the dominant position.

7. The method of claim 6, wherein the information for the determining of the dominant position includes at least one of a random number, a signal intensity, and a priority.

8. The method of claim 6, further comprising, when the one of the neighboring terminals is determined, informing remaining neighboring terminals other than the determined neighboring terminal that the one neighboring terminal is determined.

9. The method of claim 1, further comprising:
    after receiving the service information, generating a neighboring terminal list supporting the call taxi service based on the received service information and outputting the generated neighboring terminal list; and
    when one neighboring terminal is selected from the neighboring terminal list, calling the selected neighboring terminal.

10. The method of claim 1, wherein, when an application for the call taxi service is executed, the service information related to the call taxi service is contained in a signal broadcasted from the neighboring terminals within a D2D service radius based on the user terminal.

11. A non-transitory machine readable storage medium recording a program for executing the method of claim 1.

12. A user terminal for receiving a call taxi service, the user terminal comprising:
    a connector for receiving service information related to the call taxi service among services based on Device to Device (D2D) direct communication from one or more neighboring terminals adjacent to the user terminal; and
    a controller for, when the service information is received from two or more neighboring terminals, transmitting a call taxi service request to the neighboring terminals, and, when a response to the call taxi service request is received from the neighboring terminals, establishing a session connection with one of the neighboring terminals through the connector based on the response from the neighboring terminals and then performing the call taxi service.

13. The user terminal of claim 12, wherein the service information contains at least one of identification information of the neighboring terminals, service identification information indicating the call taxi service among the services based on the D2D communication, taxi company information, time information, position information, and taxi driver information.

14. The user terminal of claim 12, wherein each of the neighboring terminals is mounted within a taxi, and is one of a smart phone, a mobile phone, a digital camera, a digital audio player, a game machine, a TeleVision (TV), a display device, a head unit for a vehicle, a notebook, a laptop, a tablet Personal Computer (PC), a Personal Media Player (PMP), a Personal digital Assistant (PDA), and a navigation device.

15. The user terminal of claim 12, wherein the response to the call taxi service request contains information informing that identification information of the neighboring terminals and the call taxi service are available.

16. The user terminal of claim 15, wherein the controller transmits competition information of the neighboring terminals based on the response to the call taxi service request to the neighboring terminals.

17. The user terminal of claim 16, wherein the controller transmits the competition information and then receives information for determining a dominant position in a competition between the neighboring terminals from the neighboring terminals, and determines one neighboring terminal from the neighboring terminals based on the information for determining the dominant position.

18. The user terminal of claim 17, wherein the information for the determining of the dominant position includes at least one of a random number, a signal intensity, and a priority.

* * * * *